United States Patent
Chilcoat

[15] 3,672,706
[45] June 27, 1972

[54] MOUNTING MEANS
[72] Inventor: Kermit E. Chilcoat, North Olmsted, Ohio
[73] Assignee: Eaton Corporation, Cleveland, Ohio
[22] Filed: Jan. 26, 1970
[21] Appl. No.: 5,847

[52] U.S. Cl. ..............................285/189, 24/81 R, 285/424
[51] Int. Cl. ..........................................................F16l 5/00
[58] Field of Search ..................285/189, 420, 424; 126/113; 24/81 R, 81 PB; 248/225

[56] References Cited

UNITED STATES PATENTS

| | | | |
|---|---|---|---|
| 2,916,054 | 12/1959 | Callan | 285/424 X |
| 3,417,529 | 12/1968 | Archinal et al. | 287/189.35 X |
| 1,484,491 | 2/1924 | Gutermann | 285/424 X |
| 3,431,903 | 3/1969 | Irwin | 126/113 |
| 2,950,131 | 8/1960 | Hennen | 285/189 |

Primary Examiner—Dave W. Arola
Attorney—Teagno & Toddy

[57] ABSTRACT

Means for mounting a body, such as a furnace humidifier to a thin wall, such as the wall of a warm air duct in registry with an opening therein. In particular, this invention relates to a means which requires no metal working or hole making other than providing an opening in the wall. The mounting means is a multipiece frame which is adapted to pressingly engage the wall at the edges defining the opening therein. Several of the brackets which make up the frame are equipped with one or more rotatable clamps which may be moved to a body holding or body releasing position. The clamps, when in body holding position, engage the body and press it to the duct. When in body releasing position, the clamps disengage the body and allow it to come free of the duct. Thus, the body can easily and quickly be mounted or dismounted without the use of tools or removal of screws.

11 Claims, 8 Drawing Figures

INVENTOR.
KERMIT E. CHILCOAT
BY
ATTORNEY

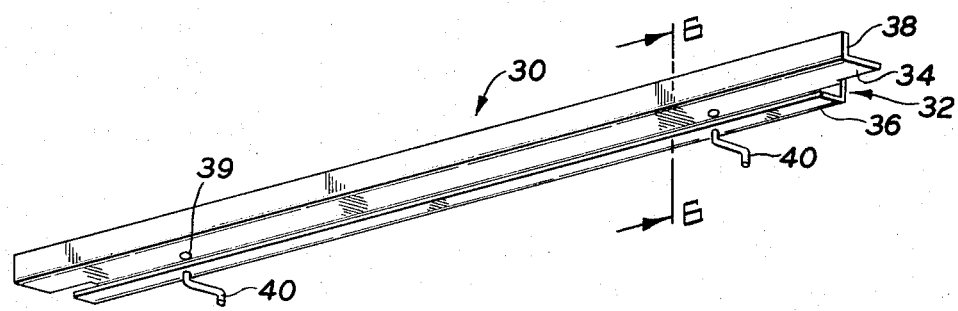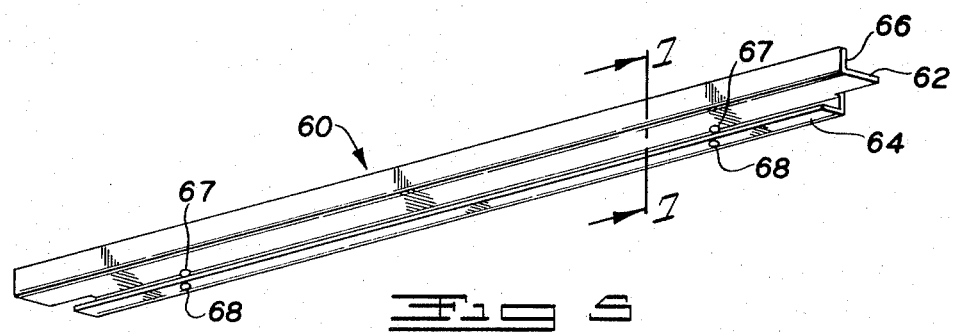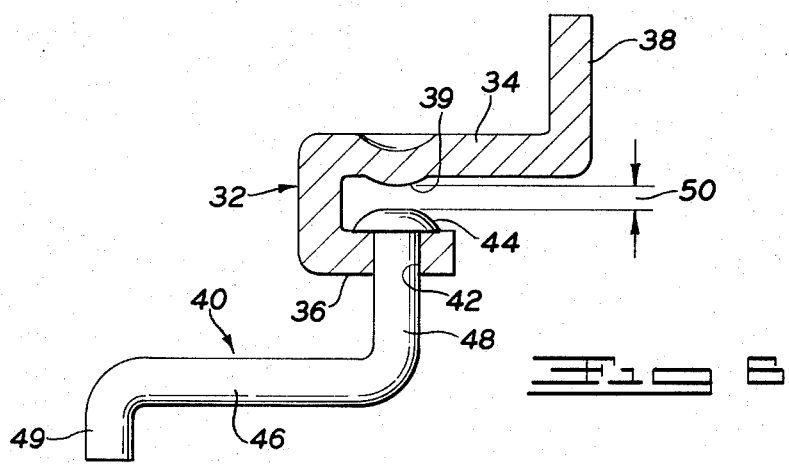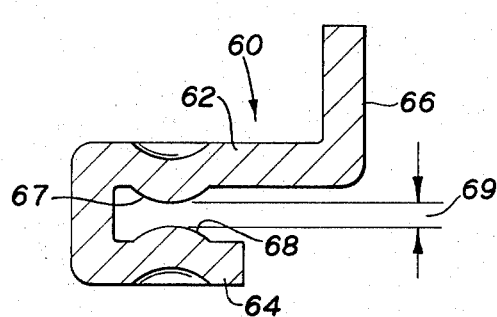

MOUNTING MEANS

BACKGROUND OF THE INVENTION

It is often desirable to mount a body at the edges defining an opening in a thin wall. Examples are mounting a furnace humidifier to a warm air duct, an inspection cover to a storage vessel, etc.

The background of this invention can best be described by considering the embodiment involving the mounting of a furnace humidifier to a warm air duct.

It is well known that heating a building with unhumidified, dry, warm air has many undesirable effects. For example, dry, warm air tends to absorb the moisture from wooden furniture resulting in drying and cracking thereof. Warm, dry air will also cause the throats and noses of the building's occupants to lose moisture and become irritated and discomforted, which in turn may cause coughing and other ill effects.

For the above and other reasons mounting a furnace humidifier is often desirable. In the past, as in the present, humidifiers were mounted at duct openings by fitting sheet metal frames to the duct then attaching the frames by multiplicity of screws. These fittings often involve the forming of dovetailed or peening flange connections, time consuming jobs requiring special tools and a considerable amount of skill. The cost of skilled labor and special tools makes a simpler, quicker mounting means very desirable. The awkward, cramped quarters in which a humidifier sometimes must be placed also makes a quicker, simpler mounting means desirable.

Earlier and present attempts to solve this and related problems by the use of the self-locking collars often proved to be less than satisfactory. The collars were often quite complicated and relatively expensive to fabricate. Once in place they usually required additional holes for positive locking by means of screws or rivets.

SUMMARY OF THE INVENTION

The present invention relates to a mounting means, and more particularly relates to means for mounting a body to a thin wall in registry with an opening therein such as, for example, a humidifier body to a warm air duct. The means consists of a multipiece frame which comprises at least two brackets which are substantially U-shaped in cross-section. Each of said brackets has at least one set of registered projections inwardly extending from the legs of the U which have a clearance less than the thickness of the duct and will therefore pressingly engage the duct when the legs of the substantially U-shaped member are forced over the edges of the duct. Carried by at least two of said brackets are rotatably mounted clamps which are rotatable to a body holding or to a body releasing position.

In operation, the brackets are forced onto the edges of the duct defining the opening therein. The humidifier body may then be mounted in registry with said opening by placing said body into registering position and then rotating said clamps into body holding position. The body may be easily dismounted by rotation of said clamps to the body releasing position and then removing said body.

It is a general object of the present invention to provide a novel and simple device for mounting bodies to thin walls in registry with openings therein.

Another object is to provide a novel, simple and inexpensive device for mounting furnace humidifiers to warm air ducts.

Another object is to provide an improved mounting device which is quickly installed without the use of tools and requires nothing other than proper location and pressure for installation.

Another object is to provide a mounting means so simple in design and construction as to effect a substantial savings in the manufacturing cost of said means.

Another object is to provide a novel and improved mounting means by which a body may be mounted to a duct in registry with an opening therein by simply rotating several clamps to a body holding position.

A further object is to provide a novel mounting means which eliminates the preciseness with which forming the receiving opening in a duct formerly required.

These and other objects and advantages of my invention will more fully appear from the following description and accompanying drawings.

BRIEF DESCRIPTION OF THE DRAWINGS

FIG. 4 is a perspective view of my mounting means.

FIG. 5 is a perspective view showing a modified form of my invention.

FIG. 6 is a sectional view taken along line 6—6 of FIG. 4.

FIG. 7 is a sectional view taken along line 7—7 of FIG. 5.

DESCRIPTION OF A PREFERRED EMBODIMENT

Figure 1:
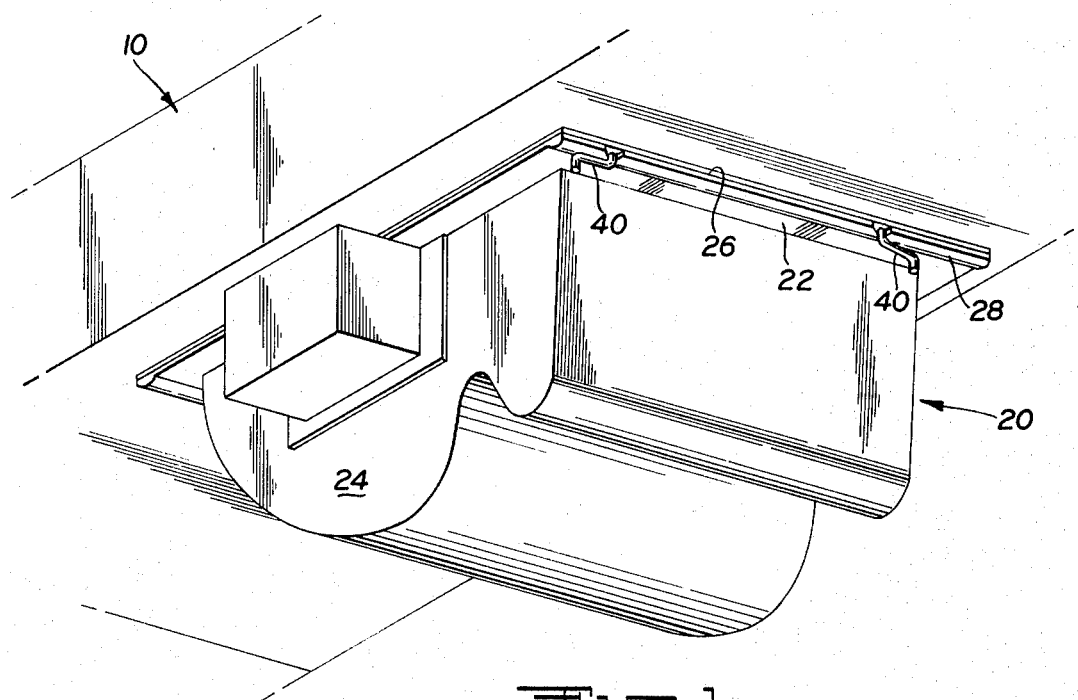
FIG. 1 is a perspective view of a furnace humidifier mounted to a warm air duct by use of my mounting means.
Figure 1A:
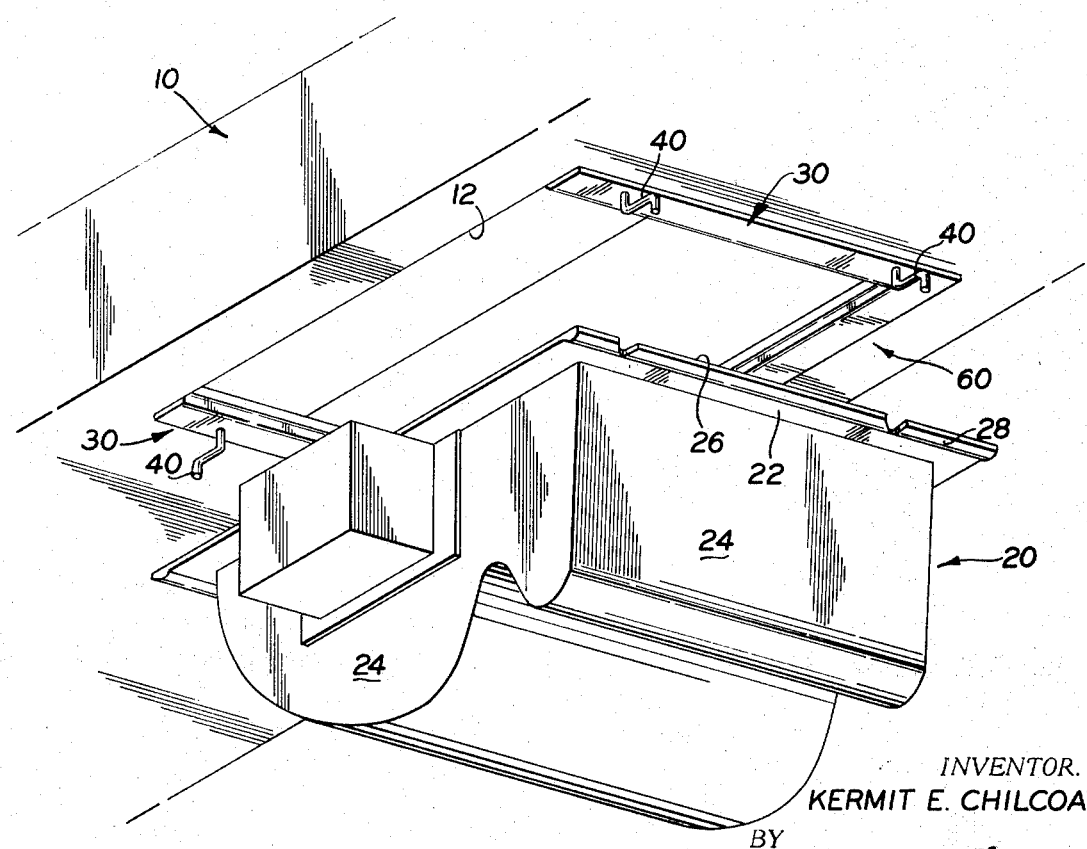
FIG. 1A is an exploded perspective view showing the furnace humidifier in position for mounting in registry with the duct opening by use of my mounting means.
Figure 2:
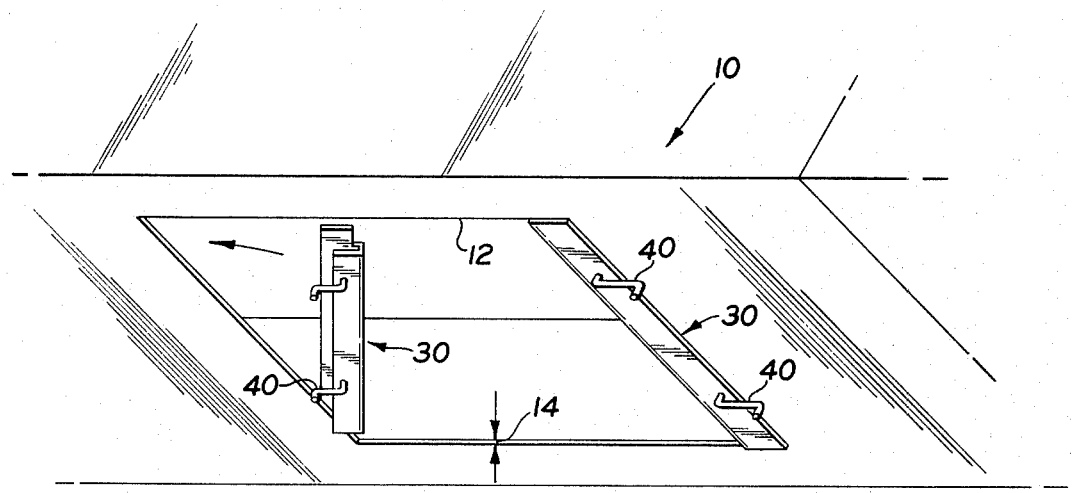
FIG. 2 is a perspective view illustrating the installation of my mounting means to a warm air duct at the edges defining an opening therein.

One embodiment of my invention may generally be seen in FIGS. 1 and 1A which show a warm air duct 10 with a rectangular opening 12 therein. As can be seen in FIG. 2, warm air duct 10 is of a thickness 14. Mounted to warm air duct 10 in registry with rectangular opening 12 is a furnace humidifier 20. The humidifier 20 is of substantially box-like shape and has flanges 22 extending perpendicularly outward from four of its sides 24 to form a surface 26 parallel to duct 10. At the outer periphery of flange 22 is a raised portion 28.

Pressed onto two of the parallel edges of rectangular opening 12 of duct 10 are fastener brackets 30 as shown in FIG. 2.

The fastener brackets 30, as may be seen by reference to FIGS. 4 and 6, are multipiece units with a substantially cross-sectionally U-shaped member 32, which has an upper leg 34 and a lower leg 36. Upwardly extending from upper leg 34 is strength adding member 38 which is an optional feature of this invention. In the preferred embodiment of this invention upper leg 34 is somewhat longer than lower leg 36 which provides a greater surface area of contact with which duct 10 supports the weight of humidifier 20. Extending downwardly from upper leg 34 is dimple projection 39.

Carried by the lower leg 36 of the cross-sectionally U-shaped member 32 is at least one rotatably mounted clamp 40. Clamp 40 is received in circular aperture 42 of lower leg 36 and is there held in position by headed section 44 of clamp 40 which is of greater diameter than is circular aperture 42.

The clamps 40 are shaped substantially as a horizontal member 46 with an upwardly extending projection 48 which passes through aperture 42 and carries headed section 44 and a downwardly extending projection 49 which serves as a handle for ease of moving the clamp between its body holding and body releasing positions. As can be seen in FIG. 1, it is the horizontal member 46 of clamp 40 that engages the humidifier 20 at flanges 22 when the clamp is in the body holding position. Clamps 40, when in the body holding position, are restrained from movement by the raised periphery 28 of flanges 22. As is shown in FIG. 1A, when clamps 40 are in the body releasing position, they cease to engage flange 22 and the humidifier body 20 may be easily dismounted for repair or refill.

The head section 44 of clamp 40 extends upwardly from lower leg 36 of cross-sectionally U-shaped member 32. Headed member 44 is registered with dimple projection 39 and projects to a distance 50, which is less than the thickness of the duct 14, from dimple projection 39. It is between registered dimple projection 39 and headed member 44 that fastener bracket 30 pressingly engages the edges of rectangular opening 12 of duct 10 when said bracket 30 is pressed onto the edges of said duct 10.

Figure 3:
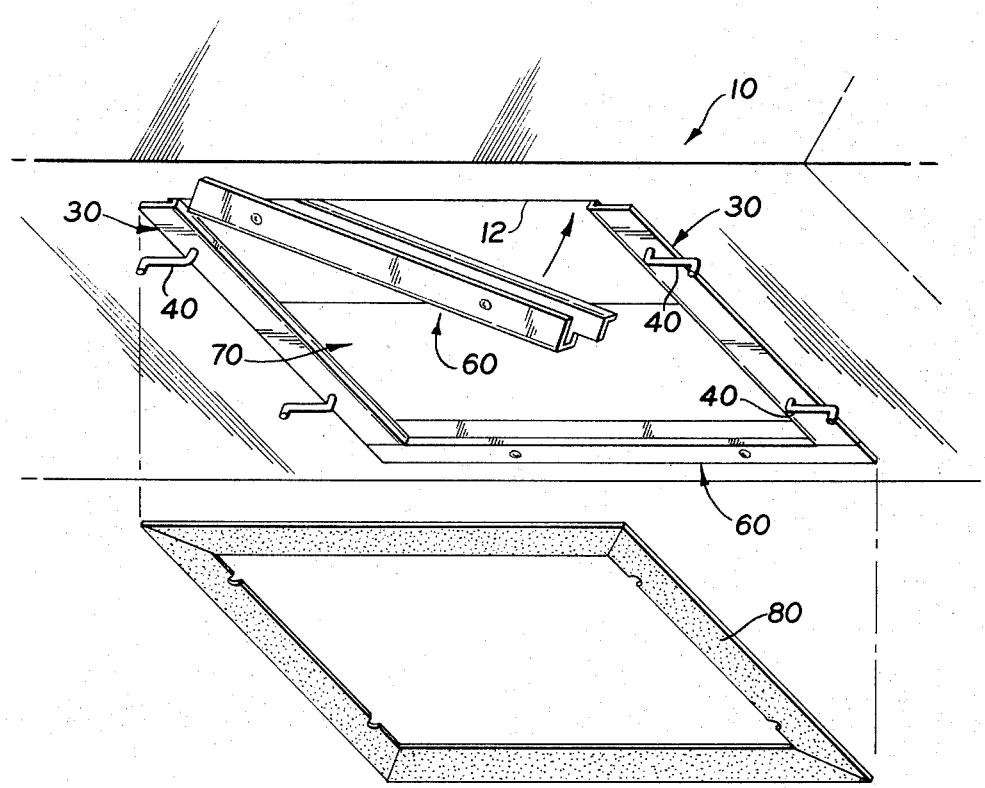
FIG. 3 is a perspective view showing a modified form of my invention.

One or more side brackets 60 may be incorporated with fastener brackets 30 (see FIG. 3). Side brackets 60 are of substantially U-shaped cross-section as can best be seen by reference to FIGS. 5 and 7. As was the case with fastener brackets 30, the side brackets have an upper leg 62, a lower leg 64, and a strength adding member 66 extending downwardly from upper leg 62. Dimple projection 67 extending downwardly from upper leg 62 is registered with dimple projection 68 extending upwardly from lower leg 64 and is at a distance 69 apart from dimple projection 68 which is less than thickness of the duct 14. It is between these registered projections that side bracket 60 pressingly engages the edges of rectangular opening 12 of duct 10 when said side brackets 60 are pressed onto said duct 10. One or more side brackets 60 may be incorporated with fastener brackets 30 to form load supporting frame 70 (see FIG 3).

To assure a snug humidifier-to-duct fit, a resilient gasket 80 of foam rubber or like suitable material may be assembled over frame 70 in such a way as to encircle duct opening 12 and be interposed to duct 10 and surface 26 when said surface 26 is pressed to said duct 10 by clamps 40 in this body holding position.

In this embodiment, duct 10 is provided with a substantially rectangular opening 12 which may be pre-formed or may require removal by rectangular piece of duct. If such removal is required, a template (not shown) can be used to lay out the exterior of the opening 12 thereby eliminating measuring and marking time.

MODE OF OPERATION

In operation, a section of warm air duct 10 is selected as advantageously located for mounting a furnace humidifier 20. A template is placed upon the duct to indicate the proper dimensions for rectangular opening 12 which is then formed by removing a piece of the duct 10 substantially conforming to the template.

As was seen in FIG. 3, fastener brackets 30 and said brackets 60 are pressed onto the edges of the duct opening 12. The fastener brackets 30 overlap side brackets 60 and interlock to form frame 70 and are pressingly held to the duct 10 by registering dimple projection 39 and headed member 44 or dimple projections 67 and 68 respectively, which pressingly engage said duct 10.

After the frame 70 is installed at the duct opening 12 a resilient gasket 80 is circumferentially assembled around the edges of the opening 12 to form an airtight humidifier-to-duct seal when the humidifier 20 is later mounted to duct 10.

The clamps 40 are then placed in body releasing position, humidifier 20 is brought into registry with duct opening 12, in which position surface 26 engages gasket 80 which is interposed said surface 26 and said duct 10. The clamps 40 are then moved over rises 28 in humidifier flanges 22 to the body holding position, in which position they engage flanges 22 and press surface 26 to the duct 10.

After the initial installation, the humidifier 20 may be easily mounted or dismounted by rotation of the clamps 40 over retaining rises 28 to the body holding or body releasing position respectively.

It can be seen that I have invented a simple, inexpensive means of mounting a body to a thin wall in registry with an opening therein which requires no special tools or skills after said opening has been formed.

It will, of course, be understood that various changes may be made in the form, details, arrangements and proportions of the parts without the parting from the scope of my invention, which consists of the matter shown and described herein and set forth in the appended claims.

What is claimed is:

1. Means for mounting a humidifier to a duct adjacent an opening therein so that the humidifier may be fully supported by said duct in registry with the opening, comprising:
    at least a pair of frame members for attachment to at least a pair of opposite edges of the opening, said frame members having a substantially U-shaped cross-section defining upper and lower leg portions and being so shaped that they may be pressed over the opening edges so as to locate the edges between the legs of the frame members, and
    rotatable clamps permanently secured to the lower leg portions of at least said pair of frame members for engagement with suitable surfaces on the humidifier so as to releasably hold the humidifier in engagement with the frame member.

2. Means for mounting a humidifier to a duct adjacent a rectangular opening therein so that the humidifier may be fully supported by said duct in registry with the rectangular opening, comprising:
    a pair of frame members for attachment to a parallel pair of opening edges, said frame members having a substantially U-shaped cross-section defining upper and lower legs, said legs having registered sets of projections extending inwardly from said legs to a clearance less than the thickness of said duct, said projections pressingly engaging said opening edges when the frame members are located so as the opening edges are between the legs of said U-shaped members, and
    a plurality of rotatably mounted clamps carried by said frame members which will engage said humidifier at a suitable surface thereof and releasably hold said humidifier in engagement with said duct, said clamps having a headed section which extends upward from the lower leg of said U-shaped member and forms the lower projection of at least one registered set of projections.

3. The mounting means of claim 2 wherein an additional pair of frame members are located for attachment to the other set of parallel opening edges in such a way as to interact with the first-mentioned pair of frame members, together forming a frame.

4. The mounting means of claim 2 wherein said suitable surface comprises flanges of the humidifier body, said flanges having a raised portion over which said clamps may be selectively rotated and which will restrain said clamps from unintended self-rotation by abutment therewith.

5. Means for mounting a body to a wall adjacent an opening therein in registry with said opening, comprising:
    at least a pair of substantially U-shaped frame members for attachment to a pair of edges of the opening, the frame members being so shaped that they may be pressed over the edges of said opening as to receive said edges between the legs of said substantially U-shaped members,
    at least one set of registered projections extending inwardly from opposite legs of said substantially U-shaped frame members to a clearance less than the thickness of the wall so as to pressingly engage said wall when said substantially U-shaped frame member is pressed onto the edge of said opening, and
    a plurality of rotatably mounted clamps carried by said substantially U-shaped member for engagement with suitable surfaces on said body so as to releasably hold said body in engagement with said wall, said clamps having a headed section which extends upwardly from the lower leg of said U-shaped member and forms the lower projection of at least one registered set of projections.

6. Means for mounting a furnace humidifier to a warm air duct in registry with a rectangular opening therein, comprising:
    one first pair of substantially U-shaped frame members for attachment to a first pair of parallel edges of said rectangular opening, said first pair of substantially U-shaped frame members being so shaped that they may be pressed over the first pair of parallel edges of said rectangular opening so as to receive said edges between the legs of said first pair of substantially U-shaped frame members,
    a plurality of rotatably mounted clamps carried by said first pair of substantially U-shaped members for engagement with suitable surfaces on said humidifier so as to releasably hold said humidifier in engagement with said warm air duct, a second pair of substantially U-shaped frame members for attachment to a second pair of parallel edges of said rectangular opening, said second pair of substantially U-shaped frame members interlocking with said first pair of substantially U-shaped members to form a mounting frame and being so shaped that they may be pressed over said second pair of parallel edges of said rectangular opening as to receive said edges between the legs of said second pair of substantially U-shaped members, and at least one set of registered projections extending inwardly from opposite legs of said first and second pairs of substantially U-shaped members to a clearance less than the thickness of said duct so as to pressingly engage said duct when said first and second pairs of substantially U-shaped members are pressed onto said first and second pairs of parallel edges of said rectangular opening in said duct, said clamps having a headed section which extends upwardly from the lower legs of said first pair of substantially U-shaped frame members to form the lower projection of said first frame member set of registered projections.

7. Means for mounting a humidifier to ductwork having an opening for registry with the humidifier comprising:

at least a pair of substantially U-shaped frame members for attachment to at least a pair of opposite edges of the opening, the frame members being so shaped that they may be pressed over the opening edges so as to locate the edges between the legs of said substantially U-shaped frame members; and clamps rotatably and permanently mounted to at least said pair of frame members for engagement with suitable surfaces on the humidifier so as to releasably hold the humidifier in engagement with the frame members.

8. The mounting means of claim 7 wherein said opening edges are pressingly held between the legs of said substantially U-shaped frame members by means of at least one set of registered projections which extend from opposite legs of said substantially U-shaped frame members to a clearance less than the thickness of said ductwork.

9. Means for mounting a humidifier to ductwork having an opening for registry with the humidifier comprising:

at least a pair of substantially U-shaped frame members for attachment to at least a pair of opposite edges of the opening; the frame members being so shaped that they may be pressed over the opening edges so as to locate the edges between the legs of said substantially U-shaped frame members, each of said U-shaped frame members having at least one set of registered projections which extend inwardly from opposite legs thereof to a clearance less than the thickness of said ductwork for engagement therewith; and clamps rotatably mounted to at least said pair of frame members for engagement with suitable surfaces on the humidifier so as to releasably hold the humidifier in engagement with the frame members, said clamps having a headed section which extends upwardly from the lower leg of said U-shaped frame member to form the lower projection of at least one set of projections.

10. The mounting means of claim 9 wherein said suitable surface on the humidifier is equipped with a flanged periphery over which said clamp may be selectively rotated, said flanged periphery engaging said clamp so that the rotatable clamp cannot self-rotate to a humidifier releasing position.

11. The mounting means of claim 9 wherein said substantially U-shaped frame members circumferentially surround said opening and overlap one another so as to form a single load supporting frame.

* * * * *